(12) United States Patent
Boroojeny

(10) Patent No.: US 10,564,041 B2
(45) Date of Patent: Feb. 18, 2020

(54) MULTI-BAND HEAT FLUX GAUGE

(71) Applicant: Worcester Polytechnic Institute, Worcester, MA (US)

(72) Inventor: Samim Safaei Boroojeny, Brighton, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/422,817

(22) Filed: Feb. 2, 2017

(65) Prior Publication Data

US 2017/0227400 A1  Aug. 10, 2017

Related U.S. Application Data

(60) Provisional application No. 62/291,191, filed on Feb. 4, 2016.

(51) Int. Cl.
*G01J 5/60* (2006.01)
(52) U.S. Cl.
CPC .................................... *G01J 5/602* (2013.01)
(58) Field of Classification Search
CPC ........................................................ G01J 5/10
See application file for complete search history.

(56) References Cited

U.S. PATENT DOCUMENTS

| | | |
|---|---|---|
| 4,037,113 A | 7/1977 | Moore |
| 4,471,221 A | 9/1984 | Middleton et al. |
| 5,785,512 A | 7/1998 | Cormier |
| 6,150,659 A | 11/2000 | Baliga et al. |
| 6,186,661 B1 | 2/2001 | Hevey et al. |
| 6,507,023 B1 | 1/2003 | Parham et al. |
| 2007/0125951 A1* | 6/2007 | Snider ................ G06K 9/00771 250/363.03 |
| 2010/0260374 A1* | 10/2010 | Akashi ................... G01N 25/72 382/100 |
| 2012/0183013 A1* | 7/2012 | Stein ....................... G01J 5/602 374/130 |
| 2015/0138534 A1* | 5/2015 | Tidhar ................... F41G 3/147 356/51 |

* cited by examiner

Primary Examiner — Christine S. Kim
(74) Attorney, Agent, or Firm — Armis IP Law, LLC

(57) ABSTRACT

A noncontact temperature sensing device receives radiative emissions from a sensed object to measure radiant heat flux and computes a temperature using multiple photodiode sensors, or elements, each sensitive to a different bandwidth of near IR light. The device samples a fluctuating heat source such as a flame or explosion at a fast sampling frequency, and compares corresponding or simultaneous readings in each bandwidth for computing a ratio of the respective bands and determining a temperature via ratio pyrometry. Multiple sensors of adjacent bands each receive corresponding readings of near IR emissions, perform fast, concurrent sampling to mitigate inconsistencies of heat source fluctuations, and compute a temperature based on a ratio between the sampled readings of the different bands. Near IR detection allows common and inexpensive photodiodes to be employed, and the photoelectric rather than thermoelectric sensing allows faster sampling and at a greater distance from the sensed heat source.

21 Claims, 2 Drawing Sheets

MULTI-BAND HEAT FLUX GAUGE

RELATED APPLICATIONS

This application claims the benefit under 35 U.S.C. § 119(e) of U.S. Provisional Patent Application No. 62/291,191, filed Feb. 4, 2016, entitled "HEAT FLUX GAUGE," incorporated herein by reference in entirety.

BACKGROUND

Conventional approaches to high temperature sensing employ blackbody radiation heat flux gauges, such as infrared sensing devices that rely on blackbody radiation science to measure the radiation and temperature of an object without physically touching it. For a lower but most common temperature range of 200° K-800° K, the physical phenomena exploited to sense this radiation is the thermoelectric effect (also known as the Seebeck effect, or Peltier effect) in which case an increase in temperature of a material creates an increase in its voltage in reference to the previous temperature of the object. In the case that this heat input is radiation, and not conduction or convection, the discrete electronic device used is a thermopile, which practically isolates the sensing element from the surrounds which may conduct or convect heat to it, and only allows radiation to enter from a transparent window. This conventional approach converts minute heat input of a small magnitude of photons into a measurable voltage, which defines the output signal used to calculate the temperature or irradiance on the sensor window. For the high temperature case, specifically 800° K-2300° K (980° F.-3680° F.), such devices may not be suitable due to the sheer magnitude of the radiant heat flux increasing many orders of magnitude, to the point of saturating the thermopile sensors.

Relevant background technology for conventional thermal measurement embrace Planck's Law of thermal radiation energy distributions over the electromagnetic wavelength spectrum as a function of an emitter's temperature. Such optical sensing systems measure an objects radiant heat flux without physically contacting it, and derive its temperature based on thermal radiation relations. These systems include radiometers, infrared thermometers, pyrometers, bolometer, thermographic cameras, and other infrared sensing device that relies on blackbody radiation science, and have been developed widely over the last century. These devices generally quantify an object's temperature by measuring the magnitude of radiation present at a certain wavelength range. The specific range used depends on the expected temperature range of the measured object, as the thermal radiation emission can vary significantly with temperature.

SUMMARY

A noncontact temperature sensing device receives heat flux or radiative emissions from a sensed object and computes a temperature using two or more photodiode sensors, or elements, each sensitive to a different bandwidth of near IR light. The device samples a fluctuating heat source such as a flame or explosion at a fast sampling frequency, and compares corresponding or simultaneous readings in each bandwidth for computing a ratio of the respective bands and determining a temperature via ratio pyrometry.

Configurations herein are based, in part, on the observation that electromagnetic emissions, particularly in the form of infrared (IR) emissions, can be an effective temperature indicator for high temperature sensing in dangerous or inhabitable environments. Radiant heat detection for performing thermal imaging, such as for firefighter safety in structure fires, can identify hot spots and flashover potential. Unfortunately, conventional approaches to heat sensing via radiative emissions detection often requires substantial equipment expenditures for sensing hardware and heat resistant materials. Conventional approaches are also limited in detection speed, and need to be placed in harsh environments proximate to the sensed heat source. Configurations disclosed herein substantially overcome the above described shortcomings by providing a sensing apparatus and method that employs multiple low-cost sensors of adjacent bands for detection of near IR emissions, performs fast, concurrent sampling to mitigate inconsistencies of heat source fluctuations, and computes a temperature based on a ratio between the sampled readings of the different bands. The use of emittance detection in the near IR range allows relatively common and readily available photodiodes to be employed as emission sensors, and the photoelectric rather than thermoelectric sensing allows faster sampling and at a greater distance from the sensed heat source. Other IR ranges, such as the short-wave IR range, may also be employed.

In the disclosed approach, two photoelectric sensors having a similar but offset spectral sensitivity are employed. Each sensed signal is processed by relating the voltage of each sensor using ratio pyrometry to determine at least one of emissivity, volume fraction, view factor or other parameter to derive the temperature and/or other sought data.

The sensed emittance from the heat source is therefore a transmission in the infrared range of the electromagnetic spectrum, which is filtered to the near IR range, and receiving is based on a photoelectric effect in a near-infrared wavelength of the electromagnetic spectrum. Using the disclosed approach, the computed temperature sensed from the object can be in the range of 1000-3000° F., and the received signal sampling typically has a frequency between 1-100 kHz, beyond conventional human or other movement that tend to obscure readings and inject ambiguity into the received signal, resulting in a computed heat signature with a high degree of reliability. A further cost consideration applies at the lower end of the spectrum, as the lower the sampling frequency without losing performance, the cheaper the device.

The sensing device employs two or more photoelectric elements as optical sensors for sampling a set of values from the optical sensors, in which that each optical sensor has a different spectral sensitivity to light emitted from a sampled object. The photoelectric elements receive, based on a sampling frequency, corresponding values in the sampled set of values from each of the optical sensors, such that the corresponding values are based on respective bands of spectral sensitivity of the receiving sensor. Each photoelectric element (sensor) receives simultaneous or near simultaneous sampled values as the other sensors, and are therefore representative of emittance intensity in the different spectral sensitivities of the sensors, allowing accurate comparison of corresponding emittance values from each near IR band. This allows computation of a temperature of the sampled object based on a ratio of the corresponding values.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
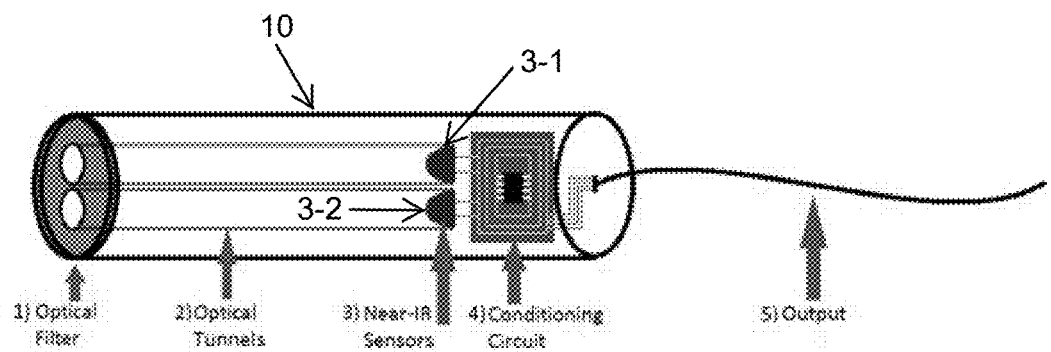
FIG. 1 is a temperature sensing device suitable for use with using the approach disclosed herein.

Depicted below is example of a thermal sensing device employing optical sensors for implementing the approaches disclosed herein. Such a device may be deployed alone, or in conjunction with an integrated apparatus for thermal imaging or a network or interconnection of similar devices directed at different areas or heat ranges.

An optical sensor as defined herein refers to a photosensor or photodiode operable to convert incident light, such as light in the IR (Infrared) range into an electric signal, typically a voltage value. An emission refers to radiant energy in the electromagnetic spectrum received by an optical sensor from a sensed object. For the configurations disclosed herein, the emissions denote electromagnetic energy in the IR wavelength range, and are often referred to generally as emittance, emitted energy, radiant energy, heat flux and other radiated mediums detectable as blackbody radiation from a thermal source or object.

Conventional devices using radiation detection for temperature impose several shortcomings. The limitations of the devices above stem from their use of either mid or far-infrared radiation for general radiometry (5-15 micrometer range), and the ultraviolet, visible and mid-infrared range for flame detection (0-5 micrometer range). Due to their physics, these infrared ranges require thermopile sensors, which have several issues:

Thermopiles need specialized optical filters typically made of exotic and expensive materials such as sapphire or quartz to filter out everything but these wavelength ranges.

The mid and far IR wavelength ranges are prone to obscuration by common gases such as water vapor, $CO_2$ and CO, which makes detection/diagnostic algorithms more complex/unreliable. Further, these wavelength ranges are also located in non-functional zones of the blackbody curves for ratio pyrometry at the high temperatures of interest, which prevents the extraction of additional data and added reliability possible at our proposed wavelength ranges. Lower temperatures may also be effectively measured based on the computed ratio between different or adjacent bands of sensed radiation.

Thermopiles need some form of thermal isolation from its surroundings to prevent unwanted conductive or convective heat transfer to it, which would skew their signals. This is usually in the form of electronic or fluid cooling systems with high precision requirements—which adds significant size, weight, power consumption and cost.

As discussed above, thermopiles sensors operate via the thermoelectric effect, which allows for the relatively low energy photons such as those at the mid and far-infrared wavelength to be sensed. This phenomena of heating sensing materials to induce a voltage signal is slow due to thermal inertia, which can result in unreliable signals from a highly fluctuating emittance source such as an active flame from a structure fire.

In contrast, the proposed method senses the near-infrared range (0.8-1.2 microns), which allows for the issues above to be overcome, primarily because the near-infrared wavelengths contain more energy so electronic sensors which utilize fundamentally different physical phenomena, the photoelectric effect, can be used. Alternatively, short wave IR sensors directed to the 1-2 micron range may also be employed. Beneficial aspects of photoelectric based sensors include viability of common, inexpensive materials such as plastics to be used, as the need for exotic optical filters is removed and common polymers can be employed. Also, common gases in the atmosphere do not obscure radiation at these near-infrared wavelengths, which adds range and reliability to this sensing method. The IR wavelength ranges are located in functional zones of the blackbody distribution for ratio pyrometry, which allows for derivation of additional parameters from the observed target, and reliability in the initial value measured.

Photoelectric sensors can be more distal from the heat source, relieving the need for heat shielding. Therefore, the devices do not need to be strictly temperature isolated from their surroundings, and the need for complex, precise and expensive cooling and insulation parts is removed; significantly reducing the size, weight, power consumption, and cost.

Due to the photoelectric effect, which is much faster than the thermoelectric effect, these sensors have response times as fast as 1 microsecond (100,000 Hz), thus allowing for much higher resolution time-series data to be gathered, at rates that no other phenomena are present (like a hand wave or ceiling fan rotation), and then used for developing unique detection and diagnostic algorithms. Slower sampling can result in inaccuracies from sporadic inputs such as a flame flicker or flare-up.

FIG. 1 is a temperature sensing device 10 suitable for use with using the approach disclosed herein. Referring to FIG. 1, an optical filtering lens 1 filters the intense incoming radiant heat flux to minimize the total energy input— typically to only the near-IR spectra of the photoelectric sensors. Optical tunnels 2 narrow the field of view of the sensors to a predetermined area, which prevents underdefined objects from contributing to the sensor's signals. The optical filtering limits received emittance to the IR spectrum, and in particular configurations may only pass near IR wavelengths in the range of 0.8-1.2 microns. Typically there is a dedicated optical tunnel for each photoelectric sensor, but alternate geometries may be defined. A plurality of photoelectric near-IR sensors 3-1, 3-2 (3 generally) receive the emitted IR light from the sensed object. In a particular example, the photoelectric sensors are photodiodes having a sensitivity band in the near IR range, in order to leverage the photoelectric effect and properties of the near IR band, discussed above. These two photoelectric sensors generate signals which are a function of the sensed object's blackbody emissions. A conditioning circuit 4 includes processor based operations that receive the raw signal of the sensor and stabilize, amplify it, and processes it to generate further outputs. Standard features like analog to digital conversion, data parceling, and automatic gain control are used as needed. Microcode, firmware and other instruction media may be employed. An output line 5 receives wired or wireless transfer of relevant output values such as the temperature of the sensed object to an external device such as a user interface, data acquisition module, or automated control system.

The device 10, therefore, is operable to perform a method of measuring a temperature by receiving near IR signals from two or more photoelectric sensors having a similar but offset spectral sensitivity band, and comparing corresponding signals from each of the photoelectric sensors. The conditioning circuit 4 and other values from the output 5 are used to compute, from a ratio of the compared signals, a temperature of a sensed object emitting the near IR signals, by relating a received voltage of the signals from each sensor using ratio pyrometry to determine at least one of emissivity, volume fraction or view factor described further below.

Figure 2A:
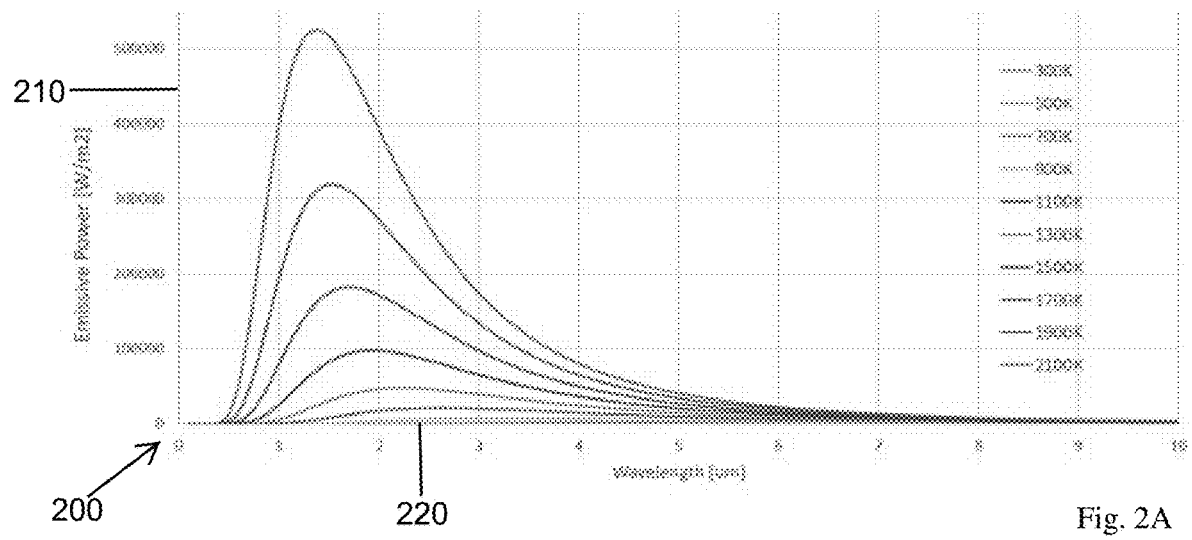
FIG. 2A is a wavelength distribution from an emissive source such as a hot object or fire.

FIG. 2A is a wavelength distribution 200 from an emissive source such as a hot object or fire, and shows a Planck distribution of radiation intensity, on axis 210, to radiation wavelength, on axis 220. FIG. 2A depicts waveforms from sensing high-temperature objects via photoelectric sensors. At >800K in temperature, objects emit practically sensible levels radiation in the near IR range. As opposed to mid/far-IR, near IR measurement allows for fundamentally different sensing technology to be used: the photoelectric rather than thermoelectric effect, which has favorable cost savings and practical implications, including no need for thermal isolation via water/electronic cooling, and high frequency sampling for added data and reduced noise. Alternate configurations may, however, employ the mid and far IR ranges with appropriate processing and IR range consideration.

In the disclosed approach, the features of faster response time response time, effectively simultaneous sampling, and ratio computations for final output values contribute to effective sensing of temperatures consistent with flames, particularly turbulent or dynamic flames having substantial fluctuation as in structure fires or explosions.

The sensing device 10 receives radiant heat flux emitted from a combustion source at a plurality of photoelectric near-IR sensors 3, such that each photoelectric sensor has a sensitivity to different bands of light, and reads a value indicative of the received heat flux from each of the plurality of sensors. Since sampling occurs asynchronously and/or simultaneously at each sensor, each value has a corresponding value from other photoelectric sensors based on a time proximity of the reading. This provides corresponding readings in both bands of IR light received by the respective sensors, allowing subsequent comparison and ratio pyrometry to be employed. The conditioning circuit receives the sampled values concurrently from each sensor, so that the asynchronous or simultaneous readings allow timely comparison. Sensor and circuit latency is expected to be negligible, such that sampling of the corresponding values may occur at a frequency in the range of 1 kHz-1 MHz within a maximum delay of 10 microseconds (μs) between corresponding values from the respective sensors. Other sampling speeds may be employed, based generally on the fluctuations in the heat source and the identification of corresponding readings in different IR bands.

A particular feature is the extraction of additional data via the two (or more) sensors with ratio pyrometry: By using two sensors of similar but offset spectral sensitivity bands, this allows for the application of a method known as ratio pyrometry to be applied. This method relates the ratio of emissions in the given sensor bands to the temperature of the source, which allows for the other variables in the signal function to be solved for—this yields a second parameter from the source, for example: emissivity, volume fraction, view factor, or another generic scalar value. These two parameters can then be fed back into the model to output the theoretical initial value, which is then compared to the measured one, and allows for the sensor's accuracy/reliability to be measured.

Further, total radiant emissions from the source may be calculated, based on fundamental blackbody radiation for a known temperature object. This is not possible without knowing the source temperature, which is unknown with only a single sensor, because the total blackbody radiation is a function of more than one variable (temperature, area, emissivity, distance etc.), and so infinite solutions exist. For example a reading of X can come from an emission temperature which is high but covers only a small area, or from an emission temperature which is lower but has a larger area.

The incident radiative heat flux at a given point, the Irradiance G, can be generally defined as:

$$G = f(T, \lambda)$$

where:
T is temperature of the source, and λ is wavelength along the emission distribution.

For a given sensor, only a portion of the total irradiance is sensed due to the limited sensible spectral band (typically only a few micrometers) in comparison to the overall spectral distribution of this irradiance (typically ranging 10-50 micrometers), and the total radiation in this range is the only consideration of its output, thus the sensor-specific irradiance function, $G_i$ is defined as the convolution (overlap, superposition, combination) of these two functions over the entire radiation spectrum (wavelength range), resulting in $G_i$ now being only a function of one variable, T:

$$G_i = G * S_i = \int G(\lambda) S_i(t-\lambda) d\lambda = G_i(T)$$

where:
G is the total irradiance incident on the sensor at a given source temperature, and $S_i$ is the spectral sensitivity function of a given sensor—this is selected based on the temperature range of the source anticipated, as well as other standard technical considerations for a thermographic device (such as the presence of interference sources).

Based on this, a given sensor signal, $I_i$, is a function of this sensor-specific irradiance, as well as the practical variables discussed above, defined as:

$$I_i = f(T, \epsilon, C, F \ldots)$$

where:
T is the temperature of the source, ε is emissivity or the source's surface, C is a calibration constant for sensor "i", and F is view factor or an arbitrary geometric variable relating the orientation of the source to the sensor (often this variable is not needed).

As discussed above, Planck's Law or a derivation of it is used to relate thermal radiation emission, and is an exponential function of wavelength and temperature—but the practical variables, emissivity, view factor, etc. are not strong functions of these two parameters, and thus they do not change significantly within a small spectral range. Typically they are simply constants that are multiplied by the exponential Planck relation.

In the approach disclosed herein, by taking two sensors of adjacent but different spectral sensitivities, the result is two different signal-to-irradiance functions, which can be used to create the ratio $\eta$:

$$\eta = \frac{I_i}{I_n} = \frac{G_i * \epsilon * C_i * F}{G_n * \epsilon * C_n * F} = \frac{G_i * C_i}{G_n * C_n} = f(T)$$

As shown above, the practical variables cancel out (in this case the simple multiplication relation allowed for easy cancelling, but a more complicated relation applied to these practical variables would ultimately cancel out as well since they remain constant), the ratio becomes merely a function of sensor-specific irradiances, which are only a function of temperature—thus the temperature of the source can be isolated from the overall radiant heat flux.

Furthermore, by now knowing this temperature, as well as the sensor-specific irradiance function, then the sensor signal "I" can be simplified:

$$I_i = G_i * C_i * \epsilon * F$$

Typically either "F" is not needed, or, $\epsilon$ is known, and thus the equation only has one variable and can be solved directly.

Figure 2B:
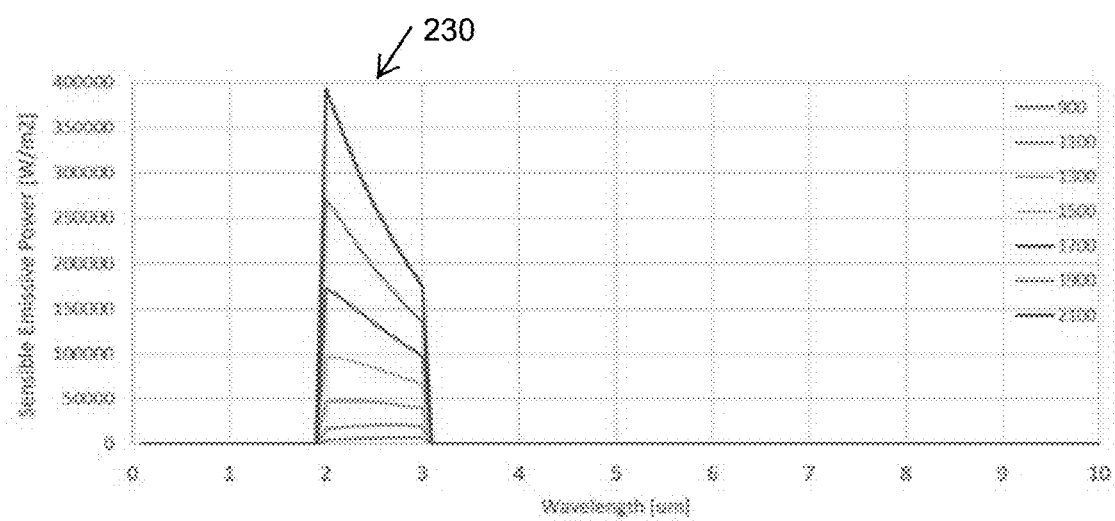
FIG. 2B is a portion of the distribution of FIG. 2A for a band of spectral sensitivity as received by a photosensor (photodiode) having a sensitivity in the range shown.

FIG. 2B is a portion of the distribution of FIG. 2A for a band of spectral sensitivity as received by a photosensor (photodiode) having a sensitivity in the range shown. Referring to FIGS. 1 and 2, a band 230 between 2 and 3 μm depicts the emittance received by a single photoelectric element sensitive to the 2-3 μm range, appearing as a "slice" of the total distribution of FIG. 2A.

Figure 3:
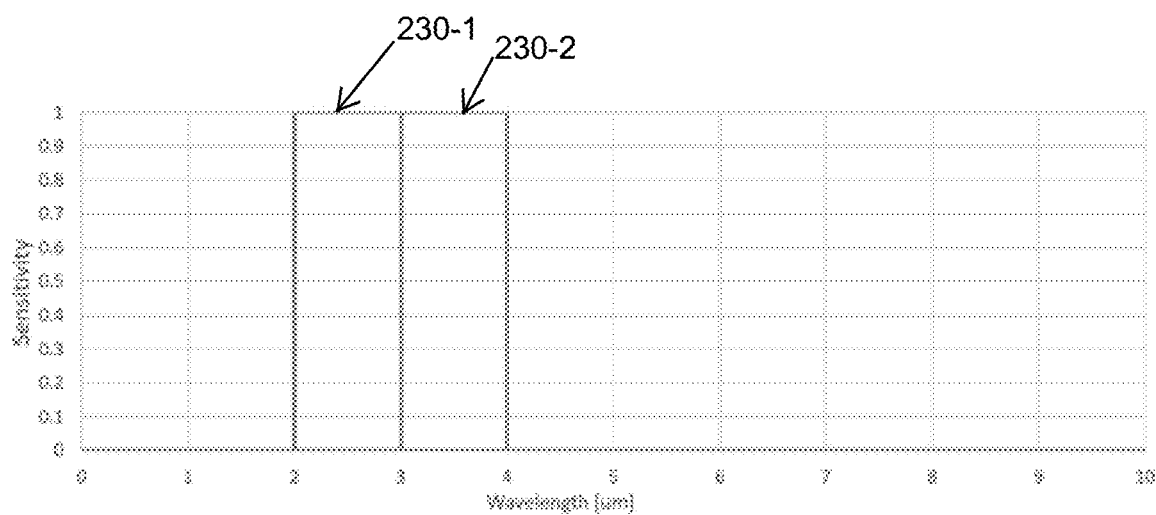
FIG. 3 shows adjacent sensitivity bands for computing a ratio between different bandwidths of differing spectral sensitivities of FIG. 2B.

FIG. 3 shows adjacent sensitivity bands for computing a ratio between different bandwidths of differing spectral sensitivities of FIG. 2B. Referring to Figs.1, 2A, 2B and 3, adjacent bands 230-1 and 230-2, each sensor receives a portion or slice of the full range of FIG. 2A. The device 100 receives emittance signals at the sampling frequency of the bands 230-1, 230-2 from a plurality of photoelectric sensors 3 responsive to a near IR range of light, such that each sensor has an offset spectral sensitivity in the adjacent band 230-1, 230-2 from the others of the plurality of sensors for sensing adjacent IR bands.

Figure 4:
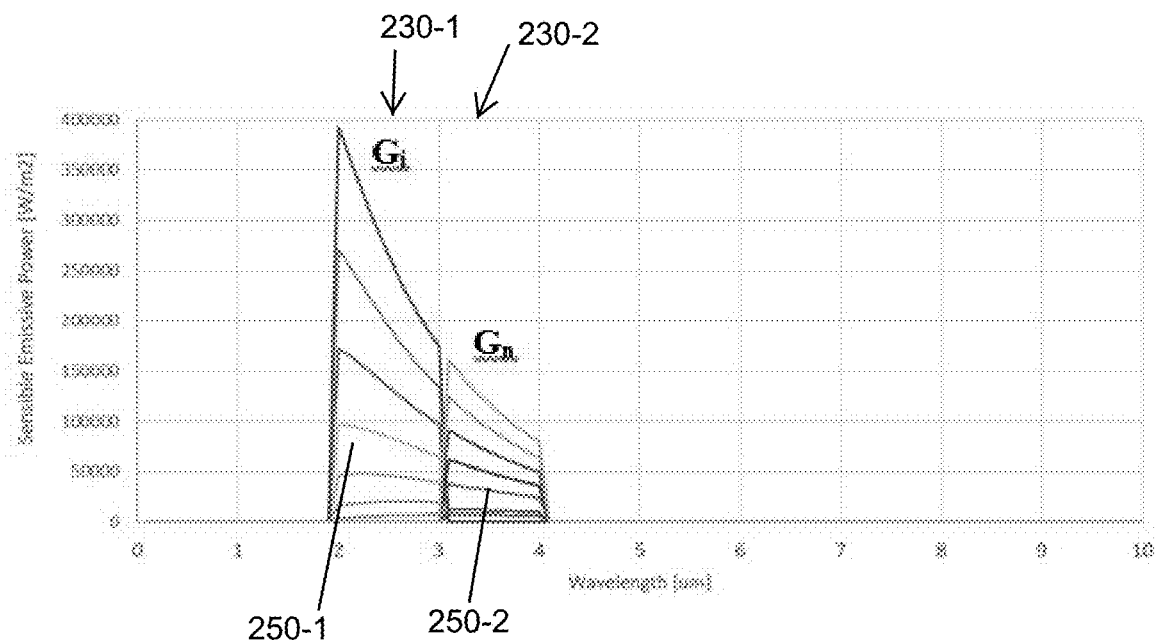
FIG. 4 shows a wavelength distribution of a heat source received by multiple sensors of the different spectral sensitivities of FIG. 3.

The approach herein employs a multi-band temperature-decoupler method using the two sensors 3-1, 3-2 having adjacent spectral sensitivity functions, described below and shown in FIG. 4. FIG. 4 shows a wavelength distribution of a heat source received by multiple sensors of the different spectral sensitivities of FIG. 3. For each set of sampled values from the multiple sensors, the conditioning circuit 4 computes a ratio based on concurrent, asynchronous sampling at a frequency greater than emission fluctuations from the heat source, such that the ratio is based on the difference in the emittance between the respective bands 230-1 . . . 230-2. When the sampling frequency is greater than the fluctuations in the heat source, such as flickering of a flame, accurate readings continue to be received even as the emittance varies. The sampling generates a set of values from each photoelectric sensor 230, thus receiving the values in the set of values includes reading an electric signal based on a magnitude of emitted light in the spectral band that the sensor is sensitive to.

Referring to FIGS. 3 and 4, the total energy of these sensible emissions 250-1, 250-2, given by the total area under the curves of Gi in FIG. 4, govern the sensor's signal, not the actual shape of this sensible emissions curve, and thus changes in the total amount of radiation due to one of the practical variables can result in the same amount of heat flux being emitted by two different temperature objects. In the example configuration, computing the temperature further includes comparing a slope and distribution for each of the corresponding set of readings from each of the plurality of sensors.

In the example of FIG. 4, at this spectral range of 2-3 μm, radiant emissions at temperatures below 900° K are much smaller, and may not be reliably measured. Spectral sensitivities in the range of 3-10 μm may be used to detect this temperature range.

Taking the ratio of the total area under the curves of Gi and Gn, defined as $\eta$, we find that $\eta$ changes at each given temperature, but does not change with practical variables since any change in the practical variables would happen to both Gi and Gn, and thus cancel out; therefore $\eta$ can be uniquely defined as a function of temperature alone for the given temperature range (900K-2100K).

Additional configurations invoke the use of a third sensor at another strategically selected spectral band, to provide further assurance of the source temperature, and to identify interferences such as background radiation.

This derivation is the most simple and general case, but is useful in other thermographic application. However, the effectiveness of this method is dependent on the spectral bands of the sensors selected—as the underlying Planck Distribution is complex and multi-variant; empirical development of the optimal (or most feasible) spectral bands to use for a given temperature range and other technical specifications must be considered on a case-by-case basis, and the "$\eta$(T)" function must be fit to different models of sensor response.

Heat flux, as used herein, takes the form of emissions from a high temperature object in the infrared (IR) region of the electromagnetic spectrum. The near IR range (0.8-1.2 um), in particular, is an advantageous medium due to other industrial uses such as electronic remotes and controls which make these sensors (typically photodiodes) readily available and inexpensive. The use of photoelectric activity rather than thermoelectric sensing improves speed and allows a greater sensing distance because a heat-based response from the sensor is not required. This allows the optical sensors to be disposed at a greater distance from the sampled object than an effective thermally based sensing medium for a sampled object having a temperature in the range of 900° K-2100° K. Conventional sensors receive radiative emissions, then issue a response signal based on the heat, whereas the photoelectric sensitivity senses the light wavelengths directly, without any need to heat the sensor.

In particular configurations, the temperature sensing device and computation approach as outlined herein may be implemented in the following contexts.

The temperature sensing device may be employed in a wearable firefighter heat exposure sensor. An array of these sensors can be integrated into firefighting equipment and used to provide sense of fire direction and quantification of heat flux exposure, which is lacking currently. Due to the harsh, smoky environment typically associated with structure fires, firefighters have very limited visibility and must wear thick gear to protect themselves from the heat and toxins—this gear, however, reduces a skin sensitivity to sense heat and accordingly, they may be thermally blinded. Such a system would be able to look through smoke, and give real-time data to users which would address these problems of reduced situational awareness.

An explosion detector can identify the rapidly expansive flame with sufficient expediency to initiate responsive action, such as closing vents and portals. Such an approach is similar the optical flame detector, but much faster in response time via different hardware and software, to enable the device to remotely detect deflagration events (thermally driven explosions). This would allow for upstream detection of explosions, rather than current locally pressure-actuated triggers, such as pyrotechnics, or pressure-transducers. This allows advantages in detector coverage area and response time to explosion relief systems (such as over-pressure relief vents, or isolation valves). This implementation would also offer advantages of cost and false alarm immunity over current sensors.

A wildland fire heat flux gauge can be developed to detect wildfires and brush fires. Forest fires and other wild vegetation combustion are an ever increasing threat to our cities, as well as our quality of life in the case of smoke drift, which is only expected to increase dramatically over the years due to several unavoidable factors (climate change, remote-urbanization, and historic wildfire mismanagement). The US government spends over $10B/yr on fighting these fires mainly on mega or campaign fires, which cause massive suppression operation costs to fire managers (USFS). In these cases, even a small improvement in operational efficiency can save millions in federal spending, as such operations can have daily expenses on the order of a $1M/day. By using inexpensive (via large volume production and disposable materials) and portable (completely self-contained, wireless) heat flux gauges, real-time detection, fire spread and heat exposure data can be used to monitor at risk assets, and navigate fire crews around untenable areas. This scale of data collected for this device would be as small as tens of feet—a resolution that is pertinent to firefighters, but is unachievable by current satellite-based thermal camera systems.

Other practical implementations include combustion diagnostics instruments. In the case of large open-burning fires (diffusion flames), such as liquid or solids fires, practical, real-time measurement of the fires burning efficiency is not available yet. This is due to existing instruments either cost or setup prohibitive (requiring elaborate laser or emitter-receiver optics with enclosed or controlled background settings, or requiring calibration to specific flames and burn configurations). By having a practical, and versatile instrument with a simple point-and-shoot operation, new applications and opportunities for diffusion fire optimization and analysis are possible. Such a gauge would utilize the fast, data rich features of these sensors to gather data from otherwise immeasurable source. An example of this is for the in-situ burning (ISB) of crude oil spills in open water, were massive amounts of soot particulate can be emitted into the atmosphere, compromising the intent of environmental protection of the ISB, if the burn is not optimized to be as clean as possible. This is challenging in field due to the dynamic and complex characteristics of each burn. By having such a real-time, remote sensor such as the disclosed device, constant monitoring and re-adjustment of the ISB is possible, which improves environmental performance and promotes adoption as a publicly accepted, clean, oil spill remediation technique Various electronic components employed above may take the form of a processor based computation. It will be appreciated by those skilled in the art that alternate configurations of the disclosed invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for computing temperature, comprising:
    sampling a set of values from a plurality of optical sensors, each optical sensor having a differing spectral sensitivity to light emitted from a sampled object;
    receiving, at a sampling frequency, corresponding values in the sampled set of values from each of the optical sensors, the corresponding values based on differing bands of spectral sensitivity of the receiving sensor including at least a first optical sensor and a second optical sensor of the plurality of optical sensors; and
    computing a temperature of the sampled object from the corresponding values by relating a ratio of total emissions received by the first and second optical sensors to the temperature of the sampled object, the total emissions based on a plurality of readings from each of the first and second optical sensors in the respective bands of spectral sensitivity, the ratio of total emissions based on concurrent sampling of each of the first and second optical sensors at a frequency greater than emission fluctuations from the heat source.

2. The method of claim 1 further comprising:
    receiving radiant heat flux emitted from a combustion source at a plurality of photoelectric sensors, each photoelectric sensor having a sensitivity to different bands of light; and
    reading a value indicative of the received heat flux from each of the plurality of sensors, each value having a corresponding value from other photoelectric sensors based on a time proximity of the reading.

3. The method of claim 1 further comprising receiving emittance signals at the sampling frequency from a plurality of photoelectric sensors responsive to a near IR range of light, each sensor having an offset spectral sensitivity from the others of the plurality of sensors for sensing adjacent IR bands.

4. The method of claim 1 wherein the optical sensors are photodiodes having a sensitivity band in the near IR range.

5. The method of claim 4 wherein receiving the values in the set of values includes reading an electric signal based on a magnitude of emitted light in the spectral band that the sensor is sensitive to.

6. The method of claim 1 further comprising disposing the optical sensors at a greater distance from the sampled object than an effective thermally based sensing medium for a sampled object having a temperature in the range of 900K-2100K.

7. The method of claim 1 further comprising sampling the corresponding values at a frequency in the range of 1 kHz-1 MHz within a maximum delay of 10 micro-seconds (μs) between corresponding values from the respective sensors.

8. The method of claim 7 further comprising optical filtering of the emitted IR light prior to sensing, the optical filtering passing near IR wavelengths in the range of 0.8-1.2 microns.

9. The method of claim 7 further comprising optical filtering of the emitted IR light prior to sensing, the optical filtering passing short-wave IR (SWIR) wavelengths in the range of 1.0-2.0 microns.

10. The method of claim 1 wherein computing the temperature further comprises comparing a slope and distribution for each of the corresponding set of readings from each of the plurality of sensors.

11. The method of claim 1 further comprising receiving, from the optical sensors, values indicative of emitted optical energy from a full unpolarized spectrum of optical energy from the sensed object within the filtered range of spectral sensitivity.

12. The method of claim 1 further comprising;
computing a temperature based on a continuous value of sensed emissions in adjacent bands from the sampled object;
computing a signal-to-irradiance function based on emissions from each of the first and second optical sensors; and
canceling common values in the signal to irradiance functions for computing sensor specific irradiance defined by temperature.

13. The method of claim 1 further comprising computing the ratio based on a total radiant emission measured in each of the plurality of values for the respective bands.

14. The method of claim 13 wherein the ratio is based on an area defined by a curve depicting emissive power in the respective bandwidths.

15. A temperature sensing device, comprising:
a plurality of optical sensors for sampling a set of values, each optical sensor having differing spectral sensitivity to light emitted from a sampled object;
an optical filter configured to direct IR light from the sampled object to the plurality of optical sensors;
a conditioning circuit for receiving corresponding values in the sampled set of values from at least a first optical sensor and a second optical sensor of the plurality of optical sensors at a sampling frequency, the corresponding values based on respective bands of spectral sensitivity of the receiving sensor, the conditioning circuit configured to compute a temperature of the sampled object from the corresponding values by relating a ratio of total emissions received by the first and second optical sensors to the temperature of the sample object, the total emissions base on a plurality of readings from each of the first and second optical sensors in the respective bands of spectral sensitivity, the ratio of total emissions based on concurrent sampling of each of the first and second optical sensors at a frequency greater than emission fluctuations from the heat source.

16. The device of claim 15 wherein the optical sensors are photoelectric sensors configured to receive radiant heat flux emitted from a combustion source, each photoelectric sensor having a sensitivity to different bands of light, and the conditioning circuit is operable to read a value indicative of the received heat flux from each of the photoelectric sensors, each value having a corresponding value from other photoelectric sensors based on a time proximity of the reading.

17. The device of claim 15 wherein the optical sensors are photoelectric sensors configured to receive emittance signals in a near IR range of light at the sampling frequency, each sensor having an offset spectral sensitivity from the others of the plurality of sensors for sensing adjacent IR bands.

18. The device of claim 15 wherein the optical sensors are photodiodes having a sensitivity band in the near IR range for transmitting an electric signal based on a magnitude of emitted light in the spectral band that the sensor is sensitive to.

19. The device of claim 15 wherein the optical sensors are configured to sample values at a frequency in the range of 1 kHz-1 MHz within a maximum delay of 10 micro-seconds (μs) between corresponding values from the respective sensors.

20. A computer program product on a non-transitory computer readable storage medium having instructions for performing a method of measuring a temperature, comprising:
receiving near IR signals from a first photoelectric sensor having a first spectral sensitivity band and a second photoelectric sensor having a second spectral sensitivity band offset from the first spectral sensitivity band;
comparing corresponding signals from each of the first and second photoelectric sensors; and
computing, from the compared signals, a temperature of a sensed object emitting the near IR signals by relating a ratio of total emissions received by the first and second optical sensors to the temperature of the sampled object, the total emissions base on a plurality of readings from each of the first and second optical sensors in the respective bands of spectral sensitivity, the ratio of total emissions based on concurrent sampling of each of the first and second optical sensor at a frequency greater than emission fluctuations from the heat source.

21. The computer program product of claim 20 wherein the method further comprises relating a received voltage of the signals from each sensor using ratio pyrometry to determine at least one of emissivity, volume fraction or view factor.

* * * * *